(12) United States Patent
Burgdorf

(10) Patent No.: US 6,481,981 B1
(45) Date of Patent: Nov. 19, 2002

(54) MOTOR-DRIVEN ASSEMBLY

(75) Inventor: Jochen Burgdorf, Offenbach (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/367,340

(22) PCT Filed: Feb. 16, 1998

(86) PCT No.: PCT/EP98/00875

§ 371 (c)(1),
(2), (4) Date: Oct. 29, 1999

(87) PCT Pub. No.: WO98/36485

PCT Pub. Date: Aug. 20, 1998

(30) Foreign Application Priority Data

Feb. 17, 1997 (DE) .......................... 197 06 124

(51) Int. Cl.[7] .............................. F04B 17/03
(52) U.S. Cl. ..................... 417/360; 417/410.1
(58) Field of Search .................. 417/360, 410.1, 417/423.15

(56) References Cited

U.S. PATENT DOCUMENTS

| | | | | |
|---|---|---|---|---|
| 1,983,262 A | * | 12/1934 | Zorzi | 417/42 |
| 2,649,048 A | * | 8/1953 | Pezzillo et al. | 417/357 |
| 3,969,044 A | | 7/1976 | Füssner et al. | 417/366 |
| 4,134,712 A | * | 1/1979 | Kemmner et al. | 417/366 |
| 4,331,883 A | | 5/1982 | Vitaloni | |
| 4,456,436 A | * | 6/1984 | Schillinger et al. | 417/366 |
| 4,501,982 A | | 2/1985 | McMinn | |

FOREIGN PATENT DOCUMENTS

| | | |
|---|---|---|
| CH | 5 80 353 | 9/1976 |
| DE | 6 05 134 | 11/1934 |
| DE | 8 75 760 | 3/1953 |
| DE | 23 08 631 | 9/1973 |
| DE | 84 14 107 | 8/1984 |
| DE | 34 07 961 | 9/1985 |
| DE | 44 44 644 | 6/1996 |
| DE | 195 43 541 | 11/1996 |
| GB | 1 596 595 | 9/1981 |

* cited by examiner

Primary Examiner—F. Daniel Lopez
(74) Attorney, Agent, or Firm—Rader, Fishman & Grauer PLLC

(57) ABSTRACT

The present invention relates to a motor-driven assembly with a motor unit and a working machine, wherein the motor unit includes a rotatable rotor with a motor shaft to drive at least one working element. The nub of the present invention is the provision of a holding element which extends through the motor shaft and pivotably mounts the rotor. These measures ensure a space-saving mounting support of the rotor, on the one hand, and a drive of the working machine with practically no vibrations and with little noise in operation, on the other hand. The holding element may be arranged, for example, as a tie rod, between the electric motor and the cover for an electronic unit and may serve for the attachment of the construction units on a pump housing.

19 Claims, 2 Drawing Sheets

MOTOR-DRIVEN ASSEMBLY

TECHNICAL FIELD

The present invention relates to motors and more particularly relates to a motor-driven assembly with a motor unit and a working machine.

BACKGROUND OF THE INVENTION

Assemblies of this type are principally known in the art and serve for various purposes of application. German patent application No. 43 15 826, for example, discloses a motor-and-pump assembly wherein an electric motor is flanged to a housing for a high-pressure pump. The rotor with its motor shaft engages into a recess of the housing 1 and has an eccentric which acts upon slidable pump pistons. The motor shaft is supported by way of respectively one bearing in the housing on each side of the eccentric. In addition, the electric motor still includes a third bearing in the area of the bottom of the bowl-shaped electric motor housing. The large overall length of the assembly is disadvantageous. Also, the electric motor in this assembly is required to overcome a great amount of frictional work because a large number of bearings are used and, besides, a large friction radius is produced due to the necessary bearing diameter.

Other assemblies have become known meanwhile wherein the motor shaft is mounted on only one side close to the motor. These assemblies suffer from the drawback, however, that the free end of the motor shaft is not supported in a sufficiently rigid manner so that oscillations and vibrations of the motor shaft are introduced directly by way of a bearing into the pump housing. Therefore, an object of the present invention is to provide a motor-driven assembly which permits a flexurally resistant mounting support of the motor shaft along with a smallest possible axial mounting space and a low weight.

This object is achieved by the provision of a holding element which extends through the motor shaft and on which the rotor is pivotably mounted. This measure ensures a reliable mounting support of the motor shaft and a small axial overall length.

Preferably working machine is configured as a pump with a pump housing, and the supporting holding element extends through at least part of the pump housing. The result is that the holding element is also supported on the pump housing.

In a preferred embodiment holding element supports the pump eccentric which is unrotatably connected to the motor shaft. Thus, both the motor shaft and the pump eccentric is supported by the pivot.

In a preferred aspect of the present invention, the motor shaft is tubular and pivotably mounted on the axle, with bearing elements interposed. The bearing elements arranged between the motor shaft and the axle have a small friction radius and thereby cause especially little frictional work. In addition, the bearing elements dampen vibrations.

In a preferred aspect of the present invention, a bearing element is arranged so as to be in alignment with a commutator in a radial direction. This measure permits utilizing the space available radially in the area of the commutator in a manner so that the axial overall length of the assembly can be shortened to a great degree. In connection therewith, it is also possible to arrange a bearing element so as to be aligned with a rotor winding in a radial direction. This is done, for example, in the area of the bottom of the bowl-shaped motor housing and also shortens the axial overall length.

In an embodiment of the present invention, the axle is mounted with a first bearing in a bore of the pump housing and with a second bearing on a bottom of a motor housing. Further, the bearing elements of the motor shaft and the pump eccentric are arranged between the bearings of the axle so that the forces are applied between the bearings of the axle. These measures ensure a reliable end-sided support of the holding element without force application at a freely projecting end.

In an embodiment of the present invention, the axle bears with a collar against the bottom of the motor housing and is supported indirectly or directly under tensile stress on the housing. These features permit the attachment of the drive unit on the housing by means of the axle, without the necessity of additional or separate attachment elements.

DETAILED DESCRIPTION OF THE PREFERRED EMBODIMENTS

Figure 1:
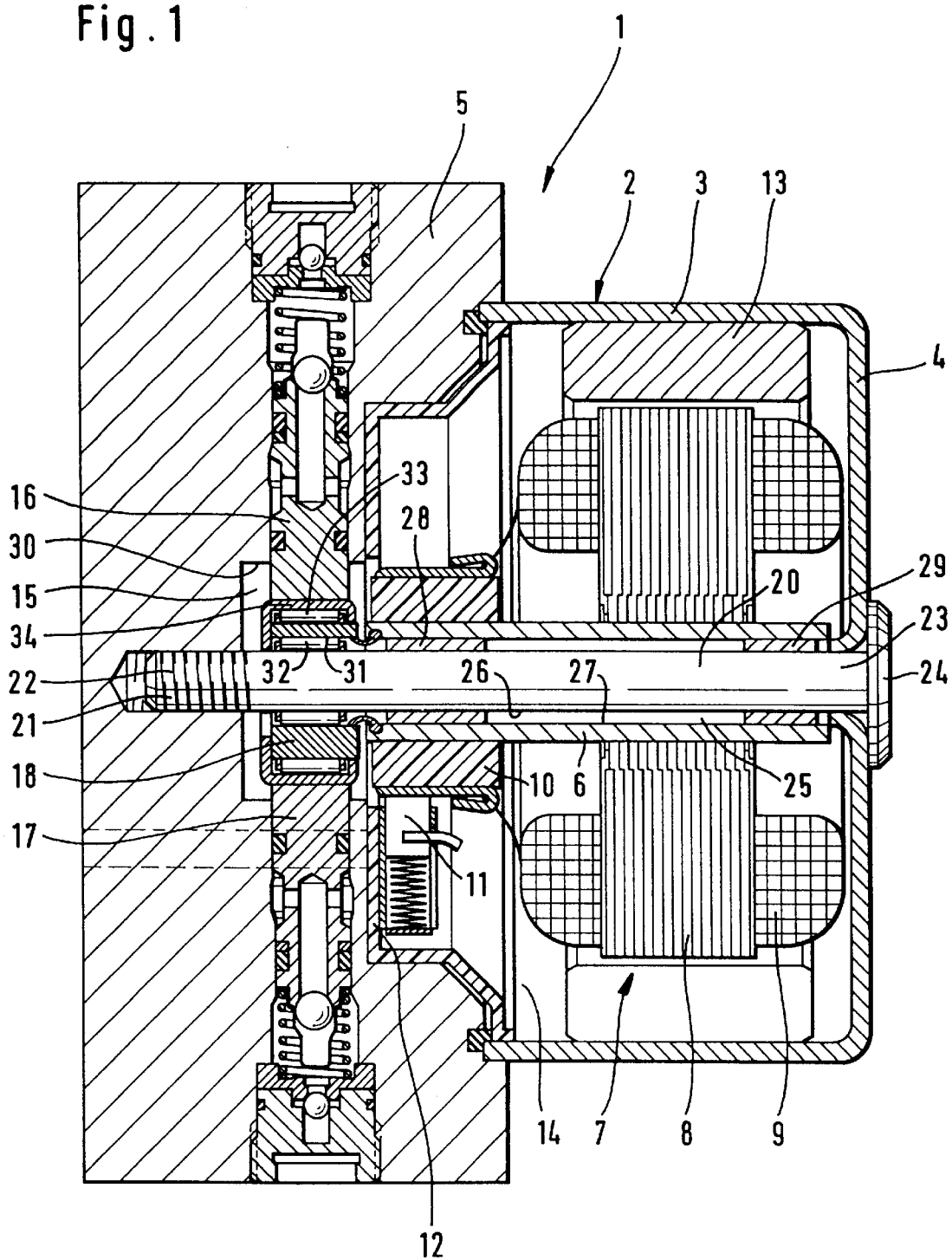
FIG. 1 is a cross-section taken through a motor-driven assembly.

The embodiment of FIG. 1 shows a motor-driven assembly 1 according to the present invention. It comprises a drive unit 2, for example, an electric motor or hydraulic motor with a motor housing 3 which is open on at least one side, is e.g. of bowl-shaped configuration and has a bottom 4 on a side remote from the pump. In addition, the assembly 1 comprises a working machine configured as a pump with a pump housing 5 that is a block with a plurality of bores which, among others, also contain pump pistons. Valves, which are not shown in the Figure, may be provided in the pump housing 5 to effect control of the pressure fluid flow produced by the pump.

The motor housing 3 houses a motor shaft 6 with a rotor 7 which includes an armature 8 and windings 9. Besides, a commutator 10 for the energization of the windings 9 is unrotatably fitted to the motor shaft 6. Brushes 11 act resiliently on the commutator 10 and are movably guided in tubular brush-holders fastened to a holding plate 12. Further, the motor housing 3 houses permanent magnets 13 which drive the motor 2 in interaction with the magnetic fields induced by the windings 9.

The holding plate 12 closes an open end 14 of the motor housing 3 and engages at least in part into a stepped bore 30 with a blind-end-hole-type indentation 15 of the pump housing 5. Projecting into the indentation 15 are the pump pistons 16, 17 which are acted upon by the pump eccentric 18 that is unrotatably coupled to the motor shaft 6.

The mounting support of the motor shaft 6 and the pump eccentric 18 is effected as follows. The motor shaft 6 is inwardly hollow like a tube and is penetrated by a holding element 20 or an axle which also extends through the indentation 15 and is unrotatably fastened in the pump housing 5. The motor shaft is free from transverse forces which e.g. are produced by the pump. Transverse forces are accommodated by the axle. As is shown in the Figure, the axle at end 21 has a thread 22 by which it is screwed into a mating thread in the pump housing 5. With the other end 23, the axle extends through the bottom 4 of the motor housing 3 and backgrips it with a step 24, formed by a flange of the axle. This safely fixes the drive unit 2 to the pump housing 5. Simultaneously, the axle that is unrotatably screwed into the pump housing 5 supports the motor shaft 6, and two bearing elements 28, 29, spaced from each other, are provided in the annular chamber 25 between the pivot surface 26 and the shaft inside wall 27. The bearing elements are sliding bearings, for example, and due to their small diameter have a small effective friction radius. This minimizes the frictional work. However, needle bearings are principally also possible as bearing elements 28, 29. The pump-sided bearing element 28 is arranged so as to be in alignment with the commutator 10 in a radial direction. Element 28 along with the motor shaft 6 and the holding plate 12 engages into the stepped bore 30 of the pump housing 5. Besides, the axle also supports the pump eccentric 18 which is unrotatably coupled to the motor shaft 6. A bearing element 32, preferably a needle bearing, is provided between the axle surface 26 and the eccentric inside wall 31. According to the above Figure, another bearing element 33 is provided on the periphery of the pump eccentric 18 and acts upon the pump pistons 16, 17 by the intermediary of an external ring 34. The external ring 34 has a bottom and is also used for axially fixing the bearing element 32.

The bearing element 29 remote from the pump is arranged so as to be in alignment with the winding 9 or with parts of the armature 8 in a radial direction. The aligned arrangement of the bearing elements 28, 29 and of parts of the rotor achieves a small axial overall length of the assembly 1. Further, it is of vital importance that the axle is supported with a first bearing in a bore of the pump housing 5 and with a second bearing in the bottom 4 of the motor housing 3. Because the bearings of the pump eccentric 18 and the bearings of the motor shaft 6 are disposed between the two bearings of the axle, there is achieved a safe and reliable support of the forces applied, with the result of reduced vibrations and, hence, less disturbing noise. Additionally, the attachment of the drive unit 2 to the pump housing 5 is facilitated because the axle with the step 24 makes catch at the bottom 4 of the motor housing 3 and is indirectly or directly supported on the pump housing 5 under tensile load.

Figure 2:
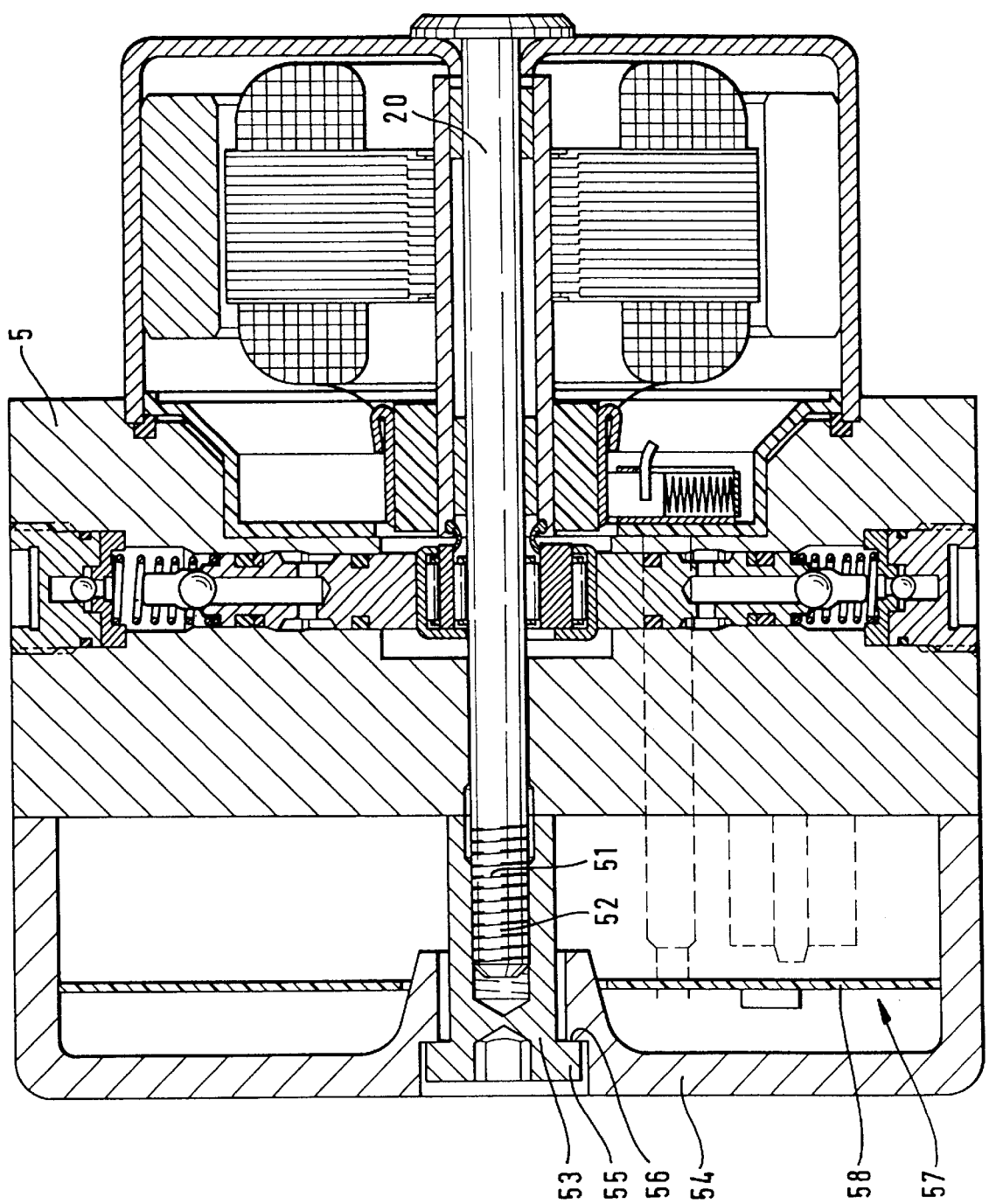
FIG. 2 is a cross-section as in FIG. 1 taken through a modified embodiment.

The FIG. 2 embodiment generally differs from the FIG. 1 embodiment because the holding element 20 extends in full through the pump housing 5 and engages with a thread 51 at the end 52 into a threaded bush 53 which is supported on the cover 54. As is shown in the Figure, the threaded bush 53 has a collar 55 which is supported on a step 56 of the cover 54. Beneath the cover 54 is a schematically represented electronic unit 57 with a printed circuit board 58 to which electronic components are fitted. Further, plug lead-throughs of the carbon brushes through the pump housing 5 up to the printed circuit board 58 are represented in the Figure.

It is important that the axle is arranged quasi as a tie rod between the drive unit 2 and the cover 54 for the electronic unit 57 and, under tensile load, serves for the attachment of the two construction units to the pump housing 5. The pivot is further used to accommodate the transverse forces and bending torques so that the motor shaft is quasi released from transverse forces.

What is claimed is:

1. Motor-driven assembly, comprising:
   a drive unit comprising an electric motor including a tubular motor shaft, a commutator, a rotor including an armature and windings for driving the motor shafts and a motor housing for housing the motor shaft and rotor;
   a working machine comprising a pump including a pump eccentric and a pump housing for housing the pump eccentric; and
   a holding element having a portion disposed within the tubular motor shaft for supporting the tubular motor shaft and the pump eccentric, one end of the holding element including threads for mating with threads in the pump housing to fixedly attach the holding element to the pump housing, and the other end of the holding element including a flange to fixedly attached the holding element to the motor housing.

2. Motor-driven assembly according to claim 1, further including an annular chamber formed between an outer surface of the annular holding element and an inner surface of the motor shaft.

3. Motor-driven assembly according to claim 2, further including two or more bearing elements provided in the annular chamber.

4. Motor-driven assembly according to claim 3, wherein one of the two or more bearing elements is axially aligned with the commutator of the drive unit.

5. Motor-driven assembly according to claim 3, wherein one of the two or more bearing elements is axially aligned with the armature and windings of the drive unit.

6. Motor-driven assembly according to claim 1, further including a first bearing provided between an outer surface of the holding element and an inside wall of the pump eccentric.

7. Motor-driven assembly according to claim 6, wherein the first bearing is axially aligned by an external ring.

8. Motor-driven assembly according to claim 7, further including a second bearing provided between an outside wall of the pump eccentric and the external ring.

9. Motor-driven assembly, comprising:
   a drive unit comprising an electric motor including a tubular motor shaft, a commutator, a rotor including an armature and windings for driving the motor shaft, and a motor housing for housing the motor shaft and rotor;
   a working machine comprising a pump including a pump eccentric and a pump housing for housing the pump eccentric; and
   an axle having a portion disposed within the tubular motor shaft for supporting the tubular motor shaft and the pump eccentric, one end of the holding element including threads for mating with threads in the pump housing to fixedly attach the axle to the pump housing, and the other end of the axle including a flange to fixedly attached the axle to the motor housing.

10. Motor-driven assembly according to claim 9, further including an annular chamber formed between an outer surface of the axle and an inner surface of the motor shaft.

11. Motor-driven assembly according to claim 10, further including two or more bearing elements provided in the annular chamber.

12. Motor-driven assembly according to claim 11, wherein one of the two or more bearing elements is axially aligned with the commutator of the drive unit.

13. Motor-driven assembly according to claim 11, wherein one of the two or more bearing elements is axially aligned with the armature and windings of the drive unit.

14. Motor-driven assembly according to claim 9, further including a first bearing provided between an outer surface of the axle and an inside wall of the pump eccentric.

15. Motor-driven assembly according to claim 14, wherein the first bearing is axially aligned by an external ring.

16. Motor-driven assembly according to claim 15, further including a second bearing provided between an outside wall of the pump eccentric and the external ring.

17. Motor-driven assembly, comprising:
   a drive unit comprising an electric motor including a tubular motor shaft, a commutator, a rotor including an armature and windings for driving the motor shaft, and a motor housing for housing the motor shaft and rotor;

a working machine comprising a pump including a pump eccentric and a pump housing for housing the pump eccentric, the pump housing including a cover with a step;

a threaded bush including a collar supported by the step of the cover; and a holding element having a portion disposed within the tubular motor shaft for supporting the tubular motor shaft and the pump eccentric, one end of the holding element including threads for mating with the threaded bush to fixedly attach the holding element to the pump housing, and the other end of the holding element including a flange to fixedly attached the holding element to the motor housing.

18. Motor-driven assembly according to claim 17, further including an electronic unit housed within the cover of the pump housing.

19. Motor-driven assembly according to claim 18, wherein the electronic unit comprises a printed circuit board electronically connected to the electric motor.

* * * * *

UNITED STATES PATENT AND TRADEMARK OFFICE
CERTIFICATE OF CORRECTION

PATENT NO.   : 6,481,981 B1
DATED        : November 19, 2002
INVENTOR(S)  : Jochen Burgdorf It is certified that error appears in the above-identified patent and that said Letters Patent is hereby corrected as shown below:

<u>Column 3,</u>
Line 61, change "the motor shafts and" to -- the motor shaft, and --.

Signed and Sealed this

Twenty-fifth Day of March, 2003

JAMES E. ROGAN
*Director of the United States Patent and Trademark Office*